US010452421B2

United States Patent
Allen

(10) Patent No.: US 10,452,421 B2
(45) Date of Patent: *Oct. 22, 2019

(54) IDENTIFYING KERNEL DATA STRUCTURES

(71) Applicant: Amazon Technologies, Inc., Seattle, WA (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,315

(22) Filed: Feb. 1, 2017

(65) Prior Publication Data

US 2017/0147387 A1 May 25, 2017

Related U.S. Application Data

(63) Continuation of application No. 14/469,390, filed on Aug. 26, 2014, now Pat. No. 9,575,793.

(51) Int. Cl.
*G06F 9/455* (2018.01)
*G06F 21/53* (2013.01)
*G06F 9/4401* (2018.01)

(52) U.S. Cl.
CPC .......... *G06F 9/45558* (2013.01); *G06F 9/455* (2013.01); *G06F 21/53* (2013.01); *G06F 9/4406* (2013.01); *G06F 2009/45562* (2013.01); *G06F 2009/45587* (2013.01); *G06F 2221/034* (2013.01)

(58) Field of Classification Search
CPC ............... G06F 9/4406; G06F 9/45558; G06F 2009/45562; G06F 2009/45587; G06F 21/53; G06F 2221/034; G06F 9/455
USPC .............. 717/131–135, 104–105, 144; 718/1
See application file for complete search history.

(56) References Cited

U.S. PATENT DOCUMENTS

| 6,167,425 | A | 12/2000 | Beckhoff |
| 7,373,520 | B1 | 5/2008 | Borthakur et al. |
| 7,904,278 | B2 | 3/2011 | Wilson et al. |
| 8,327,059 | B2 | 12/2012 | Chen et al. |
| 8,566,944 | B2 * | 10/2013 | Peinado ................ G06F 21/566 |
|           |    |         | 711/154 |
| 8,583,891 | B1 | 11/2013 | Spangler et al. |
| 8,645,950 | B2 | 2/2014 | Fries et al. |
| 8,745,308 | B2 | 6/2014 | Chen et al. |
| 8,949,797 | B2 | 2/2015 | Aaraj et al. |
| 8,950,007 | B1 | 2/2015 | Teal et al. |

(Continued)

OTHER PUBLICATIONS

Pendergrass et al., "LKIM: The Linux Kernel Integrity Measurer", 2013, The Johns Hopkins APL Technical Digest, vol. 32, No. 2, pp. 509-516.*

(Continued)

*Primary Examiner* — Ted T. Vo
(74) *Attorney, Agent, or Firm* — Davis Wright Tremaine LLP

(57) ABSTRACT

Execution state information corresponding to an instantiated virtual machine are retrieved. A score to indicate a target memory location is able to be determined based at least in part on a source memory location is computed based at least in part on the execution state information. The score and the target memory location are indicated.

20 Claims, 9 Drawing Sheets

(56) References Cited

U.S. PATENT DOCUMENTS

| | | |
|---|---|---|
| 9,575,793 B1* | 2/2017 | Allen .................. G06F 9/45558 |
| 2004/0117620 A1 | 6/2004 | Rothrock |
| 2005/0005101 A1 | 1/2005 | Yenduri |
| 2005/0091365 A1 | 4/2005 | Lowell et al. |
| 2005/0223362 A1 | 10/2005 | Whitlock et al. |
| 2006/0015732 A1 | 1/2006 | Liu |
| 2006/0242406 A1 | 10/2006 | Barde et al. |
| 2006/0294592 A1 | 12/2006 | Polyakov et al. |
| 2008/0320594 A1 | 12/2008 | Jiang |
| 2009/0006862 A1 | 1/2009 | Alkove et al. |
| 2010/0223613 A1 | 9/2010 | Schneider |
| 2010/0325628 A1 | 12/2010 | Haga et al. |
| 2011/0047621 A1 | 2/2011 | Brando et al. |
| 2011/0283358 A1 | 11/2011 | Cochin et al. |
| 2011/0321166 A1 | 12/2011 | Capalik et al. |
| 2012/0011501 A1 | 1/2012 | Filali-Adib et al. |
| 2012/0311341 A1 | 12/2012 | Paris et al. |
| 2013/0047150 A1 | 2/2013 | Malasky et al. |
| 2014/0068704 A1 | 3/2014 | Grewal et al. |
| 2014/0215461 A1 | 7/2014 | Laor et al. |
| 2014/0298338 A1 | 10/2014 | Doi |
| 2014/0372717 A1 | 12/2014 | Ciu et al. |
| 2015/0199514 A1 | 7/2015 | Tosa et al. |
| 2015/0220735 A1 | 8/2015 | Paithane et al. |

OTHER PUBLICATIONS

Saur et al., "Locating x86 paging structures in memory images", 2010, ScienceDirect, pp. 28-37.*

Carbone et al., "Mapping Kernel Objects to Enable Systematic Integrity Checking," Proceedings of the 16th ACM Conference on Computer and Communications Security, Nov. 9-13, 2009, 11 pages.

Third Party Submission Under 37 CFR 1.290, dated Feb. 23, 2018, for U.S. Appl. No. 15/698,399, filed Sep. 7, 2017, 14 pages.

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.

Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

* cited by examiner

IDENTIFYING KERNEL DATA STRUCTURES

CROSS-REFERENCE TO RELATED APPLICATIONS

This application is a continuation of U.S. patent application Ser. No. 14/469,390, filed Aug. 26, 2014, now U.S. Pat. No. 9,575,793, entitled "IDENTIFYING KERNEL DATA STRUCTURES," which is incorporated by reference for all purposes. This application also incorporates by reference for all purposes the full disclosure of U.S. patent application Ser. No. 14/469,200, filed Aug. 26, 2014, now U.S. Pat. No. 9,530,007, entitled "IDENTIFYING TAMPER-RESISTANT CHARACTERISTICS FOR KERNEL DATA STRUCTURES," U.S. patent application Ser. No. 14/469,151, filed Aug. 26, 2014, now U.S. Pat. No. 9,507,621, entitled "SIGNATURE-BASED DETECTION OF KERNEL DATA STRUCTURE MODIFICATION," and U.S. patent application Ser. No. 14/468,943, filed Aug. 26, 2014, now U.S. Pat. No. 9,767,276, entitled "SCANNING KERNEL DATA STRUCTURE CHARACTERISTICS."

BACKGROUND

Modern computer systems place a high importance on maintaining system security. In many computer systems, and especially those involving computing environments utilizing virtualization where a plurality of machines may be hosted on shared physical host machines, security of the computer system and the applications and data on that computer system may be an important concern. An attack on the security of a computer system may seek to compromise that security and, if successful, allow the attacker to acquire access to otherwise protected systems, applications and/or data. One typical method of attack is to attempt to seize control of the kernel of an operating system operating on a computer system and to thus seize control of the computer system. One typical method of seizing control of the kernel of an operating system is where an attacker may seek to alter and/or otherwise control data structures within the kernel. Kernel data structures are highly attractive to computer attackers due to their vast influence on the operation of a computer system. Tampering, modifying, or overwriting a kernel data structure with information controlled by an attacker can lead to a wide range of exploitive behavior. As many kernel data structures are undocumented or vary in structure and location among operating systems and operating system versions, systematic identification and protection of kernel data structures may be difficult, leading to increased opportunities for exploitation of kernel data structures and increased vulnerabilities of computer systems.

BRIEF DESCRIPTION OF THE DRAWINGS

Various embodiments in accordance with the present disclosure will be described with reference to the drawings, in which.

DETAILED DESCRIPTION

Figure 1:
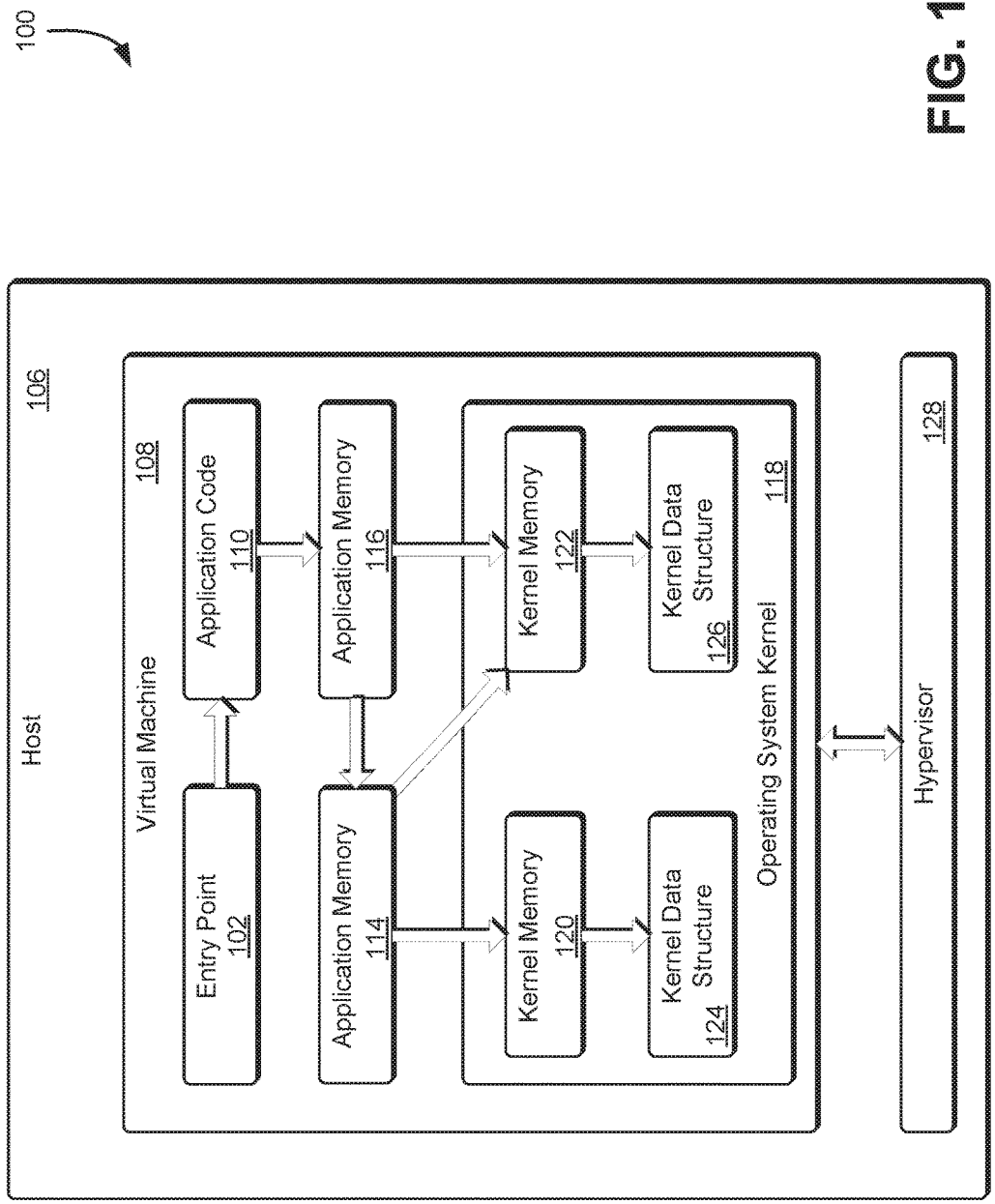
FIG. 1 illustrates an example environment where memory locations which may have access to kernel data structures may be identified within a virtual machine image in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes to enable a hypervisor to locate and identify kernel data structures associated with one or more virtual machine (VM) instances on a virtualized computer system using a combination of static analysis and dynamic analysis techniques. A hypervisor, operating within the computer system, statically analyzes data structures in a VM image to determine which of those data structures include direct or indirect references to candidate kernel data structures. In some embodiments, a hypervisor may statically analyze data structures in a VM to determine other types of sensitive candidate data structures including, for example, data structures within kernel modules, data structures with drivers, data structures within protected regions and other candidate data structures. An analyzed data structure may include direct or indirect references to candidate kernel data structures and/or other candidate data structures if, for example, as a result of following memory addresses (also referred to herein as "pointers") contained within that data structure, a kernel data structure and/or some other data structure may be reachable. Locating and/or identifying kernel data structures within a VM image is then used to improve system security. The hypervisor may perform the analysis of the VM image for kernel data structures by instantiating and analyzing one or more VM instances based on the VM image to verify whether the identified candidate kernel data structures may be actual kernel data structures. Those that are not actual kernel data structures may be removed from the list and those that are validated as actual kernel data structures are retained, along with information about how they may be reached along with other relevant metadata such as a kernel identifier, software versions applications operating within the VM associated with the VM image. By identifying kernel data structures, the kernel data structures are protected from tampering by attackers.

Further, to overcome the difficulties identifying kernel data structures, techniques described herein enable automatic location and identification of kernel data structures, regardless of the operating system type, version, alterations, data type, data contents or other such kernel data structure conditions. For example, kernel data structures may be identified within a VM or its image using a hypervisor. First, a hypervisor associated with a computer system may be provided with access to a VM image. The VM image may be a snapshot of a VM, a specification for a VM, a description of a VM or a running VM. Next, the hypervisor may perform a static analysis of the VM image and/or of the executable operating system kernel to determine the reachability of memory locations within the VM and/or within the executable operating system kernel. Then, the hypervisor may instantiate one or more representative VMs from the VM image, based on the executable operating system kernel. The one or more instantiated VM images may be instantiated sequentially (e.g., one at a time) or may be instantiated in parallel (e.g., multiple simultaneous instances).

The hypervisor then begins taking memory snapshots of the representative VMs, selects one or more user process entry points of the representative VMs and associates the user process entry points with memory locations in the memory snapshots. This initial association of user process entry points with memory locations may be represented by a pointer reachability graph, which is a graph representation with nodes representing memory locations and edges representing references between those memory locations. For example, an entry point in user space code may contain two memory locations that point to data structures, and each of those data structures may contain (perhaps at an offset), two other memory locations that point to kernel memory. The pointer reachability graph in this example may contain nodes representing the memory locations and edges representing the pointers to the memory locations.

The hypervisor then begins validating the contents of the pointer reachability graph by tracing through the memory snapshot to determine if kernel data structures are reachable from the user process entry points. For example, a user process entry point may include data structures containing one or more pointers and/or potential pointers. Actual pointers in the memory snapshot from the running VM images that correspond to edges in the pointer reachability graph may validate that the edge is a valid edge. Similarly, if actual pointers in the memory snapshot do not correspond to edges in the pointer reachability graph, it may be an indication that the edge is not a valid edge.

The hypervisor validates the contents of the pointer reachability graph by traversing the graph and mapping source pointers in the pointer reachability graph to memory locations in the memory snapshot. Then, the hypervisor retrieves a pointer address from the mapped memory location, selects an edge of the pointer reachability graph originating from the source pointer and terminating at a target pointer and calculates a pointer transformation from the source pointer to a target pointer associated with that edge. Next, the hypervisor transforms the pointer address using the pointer transformation, and retrieves a portion of the memory snapshot based at least in part on the transformed pointer address and type information associated with the edge. The hypervisor then validates the traversal by validating that the pointer address and transformed pointer address are legal memory addresses, that the portion of the memory snapshot contains data laid out in accordance with the type information, or that data fields included in the portion of the memory snapshot are appropriately memory-aligned.

Finally, the hypervisor updates the pointer reachability graph by removing nodes corresponding to pointers that were not validated and/or by removing edges associated with those nodes. In some embodiments, the validation produces a confidence score (also referred to herein as a "measurement of confidence") for reachability for nodes that is calculated using multiple instantiations of the VM image. In such embodiments, a node or edge that is validated during a particular instantiation may have its confidence score increased while a node or edge that is not validated during a particular instantiation may have its confidence score decreased. The hypervisor may then remove nodes or edges with low confidence scores. Finally, based at least in part on the updated pointer reachability graph, the hypervisor may generate a kernel data structure layout map and associate such a kernel data structure layout may with the metadata (e.g., the kernel identifier) associated with the VM image.

FIG. 1 illustrates an example environment 100 where memory locations which may have access to kernel data structures may be identified within a virtual machine image in accordance with at least one embodiment. As discussed herein, determining the locations of kernel data structures using a generally applicable method helps a computing resource service provider improve the security of virtual machines operating within an environment by identifying and/or protecting potentially vulnerable data structures. Information about the kernel data structures may not be readily available, primarily because there is little documentation on kernel data structures for a particular operating system version nor is there publicly available application programming interface to discover these kernel data structures. Similarly, there are a wide variety of operating system configurations and/or versions and each of these different configurations and/or versions may have different kernel data structures. The method described herein allows identification of kernel data structures in virtual machines running under control of a hypervisor by the process of analysis and discovery.

Kernel data structures are collections of data elements associated with an operating system kernel, which allow the operating system to track one or more states of the computer system. For example, when a new user logs onto a computer system, a kernel data structure may be created and/or modified to reflect data about that user including login times, permissions, resources and/or other such data. Similarly, when a new process is instantiated on a computer system, a kernel data structure relating to that new process may be created and/or modified to represent that process. Kernel data structures may be used by other processes within the kernel to control resources associated with the computer system. In the example of the kernel data structure associated with the new process, the operating system may use data in the kernel data structure to manage scheduling of the process, the priority of the process, whether to suspend the process, how and when to associate resources with the process and/or other such operating system related operations. Data structures (including kernel data structures) may contain data items such as numbers, strings, arrays, counters, dates, times and/or other such data items, pointers to other data structures, pointers to executable code and/or other such data items.

Kernel data structures may be considered attractive targets for attackers and/or malicious users, processes, applications, services, modules and/or other such computer system entities. Such attackers may make alterations to kernel data structures to obtain permissions and/or privileges related to the computer system. For example, a kernel data structure may contain a legitimate reference to executable code related to the operating system. Such a kernel data structure may be used by a process scheduler to facilitate the execution of that code on a regular basis with privileged access. If an attacker were to substitute a reference to different executable code within that kernel data structure, then the different executable code might be run on a regular basis and with privileged access instead. Because scheduling of applications within the operating system may occur at a low level, it may be difficult for an application to detect such malicious activity.

Kernel data structures may be difficult to identify for a number of reasons. There is typically a wide variety of operating system types within a single computing environment, from a number of different vendors. Additionally, each of the different operating system types may undergo a large number of changes as they are developed and patched, often resulting in dozens or even hundreds of different versions for a single operating system. Operating system vendors also typically do not catalog these kernel data structures or provide lists of such kernel data structures as they are intended for internal consumption within the operating system. Finally, because of their nature, kernel data structures are often optimized for speed rather than usability. So a kernel data structure may contain what may appear to be an array of numbers but that array of numbers may be recast as an array of pointers and those pointers may be used to access other areas within memory.

A virtual machine 108 may be operating on a host 106, under the control of a virtualization monitor such as a hypervisor 128, which may also be operating on the host 106. The virtual machine 108 may be one of a plurality of virtual machines and may, for example, be a virtual machine image (e.g., a specification for a virtual machine) or a running virtual machine. The virtual machine 108 may be operating in a standard execution state, or may be operating in a paused state, or may be operating in a suspended state or may be operating in some other state. In some embodiments, the virtual machine 108 may be a controlling domain and may have privileged access the host 106.

In an embodiment, the hypervisor 128 is provided with access to a VM image. The VM image may be a snapshot of a VM, a specification for a VM, a description of a VM and/or a suspended or paused VM. The VM image may also include an image of an executable operating system kernel including, but not limited to, a memory map of that executable operating system kernel. The VM image may also include metadata associated with the VM image including, but not limited to, a kernel identifier for the operating system kernel, version information for the operating system kernel, patches to the operating system kernel (also referred to herein as "kernel patches" or "patches"), a compiler version associated with the operating system kernel, and/or other such metadata. The metadata may be obtained by examining the VM image, or by examining a description of the VM image such as may be published within a VM image catalog or by examining some other such VM image data. The VM image and/or the metadata associated with the VM image may be used to obtain an identifier for the VM image which may be used to distinguish, at least in part, the VM image from other VM images within the computer system. An obtained identifier may not be an exact, deterministic and/or unique identifier and may instead provide a sufficiently accurate correlation between the identifying information and the VM image. For example, an identifier for a VM image based on the Linux® operating system may include information based on the software version, patches, the vendor, the kernel version, the compiler, any kernel modules, any drivers, the creation date and/or other such information. More accurate information may provide a more unique, and thus a more correlative identifier.

The hypervisor 128 may perform one or more operations to locate an entry point 102, located within an instance of application code 110, operating within the virtual machine. The one or more operations to locate the entry point 102 may involve static analysis techniques (e.g., analysis of a virtual machine image and/or analysis of a virtual machine in a paused and/or suspended state), or may involve dynamic analysis techniques (e.g., analysis of a running virtual machine) or may involve a combination of these and/or other such analysis techniques. The hypervisor may then perform further iterations of the one or more operations, to locate and analyze memory locations that are reachable from the entry point 102. For example, one approach for static analysis is to start a location within memory such as the entry point 102 and determine all instructions and/or other memory locations that may be reachable from that location. Static analysis may then proceed by selecting each of those instructions and/or other memory locations and determine all instructions and/or other memory locations that may be reachable from each of those selected instructions and/or memory location. Static analysis may continue searching through the memory until all terminating locations (e.g., locations with no further reachable child locations) are found. The entry point 102 may be one of a plurality of entry points to an instance of application code 110 operating on the virtual machine 108. The instance of application code 110 may also be one of a plurality of instances of application code that may include the entry points.

The static analysis may proceed as described herein and, in the example illustrated in FIG. 1, may result in a determination that the entry point in the application code may reference application memory 116, which may reference application memory 114 and kernel memory 122. Application memory 114 may access kernel memory 120 and may also access the kernel memory 122 within the operating system kernel 118. Kernel memory 120 may reference a kernel data structure 124, which may be a terminating location (e.g., may have no memory references contained therein). Kernel memory 122 may reference a kernel data structure 126, which may also be a terminating location.

Figure 2:
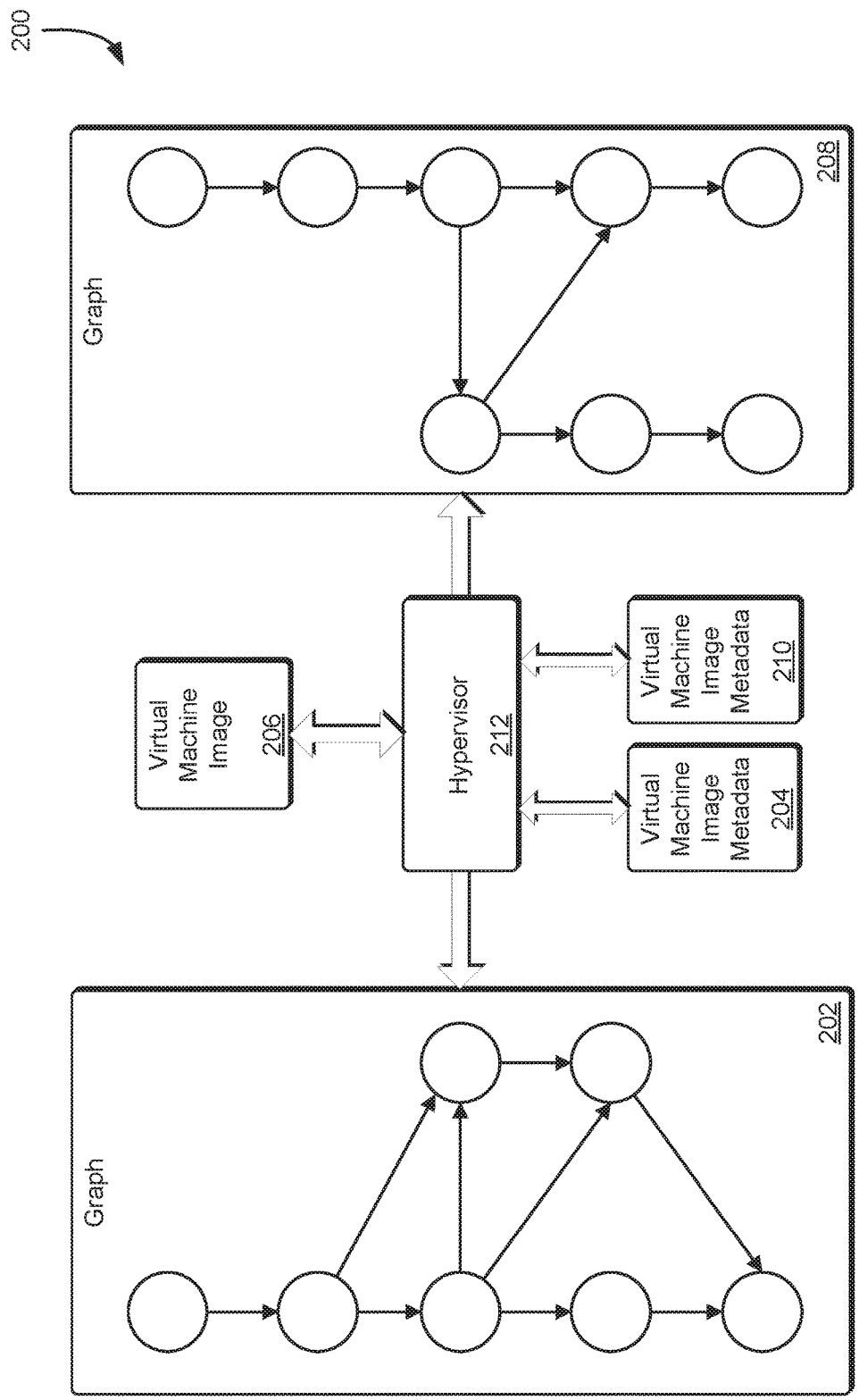
FIG. 2 illustrates an example environment where an initial pointer reachability graph associated with a virtual machine image may be constructed in accordance with an embodiment.

FIG. 2 illustrates an example environment 200 where an initial pointer reachability graph associated with a virtual machine image may be constructed as described herein in connection with FIG. 1 and in accordance with at least one embodiment. The hypervisor 212 may perform a static analysis and/or dynamic of the executable operating system kernel within the virtual machine image 206 to determine the reachability of memory locations within the executable operating system kernel. The hypervisor 212 may use data obtained from this static analysis to produce a reachability graph such as the reachability graph 202 or the reachability graph 208 for the memory locations within the executable operating system kernel. A reachability graph may consist of vertices corresponding to pointers used by the executable operating system kernel and edges corresponding to links between pairs of the pointers represented by the vertices. A reachability graph may include an edge from a first (source) pointer to a second (target) pointer when the address of the target pointer can be derived from either the address of the source pointer or the data pointed to by the source pointer.

In the example illustrated in FIG. 2, a reachability graph 202 and a reachability graph 208, each of which derives from a different entry point, are shown (the reachability graph 208 corresponds to the example illustrated in FIG. 1). The reachability graph 202 may be based at least in part on virtual machine image metadata 204, which may be associated with the virtual machine image 206. The reachability graph 208 may be based at least in part on virtual machine metadata 210, which may be associated with the virtual machine image 206. The virtual machine image metadata 204 and the virtual machine metadata 210 may be the same virtual machine metadata, or may share some common characteristics or may be disjoint.

There are a variety of ways that the address of the target pointer may be derived from either the address of the source pointer or the data pointed to by the source pointer. In the simplest example, the source pointer may point to a memory location which contains the target pointer. In a more complex example, the source pointer may point to a memory location that contains a data structure and, at some offset from the beginning of the data structure, is a memory location which contains the target pointer. In a still more complex example, the source pointer may point to a memory location that contains raw data which, under the control of executable instructions, may be recast from raw data to a target pointer. Recasting data from one data type (e.g., a number) to another data type (e.g., a pointer) is a common operation within computer systems. For example, a source pointer may point to a memory location may contain sixteen values, each of which is a single byte (a "byte" being a fundamental computer system data type consisting of eight bits, or eight binary digits). The sixteen byte values in this example may be recast to eight values, each of sixteen bits, or four values, each of 32 bits, or two values, each of 64 bits, or one value of 128 bits. Other, less common methods of recasting the sixteen byte values may include mixing different data sizes and/or using data sizes other than powers of two. A collection of data items may be recast in different ways at different times during execution, at one point treating the data items as single bytes and at another, treating them as four-byte values. As may be contemplated, the methods of deriving the address of the target pointer from the address of the source pointer or from the data pointed to by the source pointer described herein are merely illustrative examples and other such methods of deriving the address of the target pointer from the address of the source pointer or from the data pointed to by the source pointer may be considered as within the scope of the present disclosure.

The static analysis of the executable operating system kernel to determine the reachability of memory locations within the executable operating system kernel may be performed using the binary instructions of the executable operating system kernel, or may be performed using the source code for the executable operating system kernel or may be performed using a combination of the binary instructions and the source code. Deriving the target address of the target pointer from either the address of the source pointer or the data pointed to by the source pointer may require determining whether a memory location constitutes a pointer and/or whether that pointer references a valid memory location. For example, a virtual machine with sixty-four megabytes of memory and with a memory alignment on an eight-byte boundary would have valid memory locations for values less than sixty-four megabytes and with values aligned on those eight-byte boundaries. In an embodiment, a misaligned memory location can be invalid, or can be valid but with a reduced confidence score or can be valid. A pointer may reference an invalid memory location if, for example, the pointer contains a value that is less than a minimum threshold value (for example, contains zero, or contains a value pointing into low-end reserved memory), or if the pointer contains a value that is greater than a maximum threshold value (for example, greater than the available address space of the machine), or if the pointer contains a value within reserved memory (for example, memory pointing to memory-mapped hardware memory) or, as described above, if the pointer is not properly memory aligned. In an embodiment where the static analysis is performed at least in part using the source code, information in the source code including, but not limited to, the presence of pointer data types and/or pointer operators may provide such determination of pointer data types. In an embodiment where data may be recast (e.g., from an array of byte values to a pointer), pointer data types and/or pointer operators may provide such determination of pointer data types in some executable code regions and not in other executable code regions.

The determination of whether a memory location constitutes a pointer and/or whether the pointer value corresponds to a valid memory location may require using one or more heuristics to make such a determination. For example, when the static analysis of the executable operating system kernel to determine the reachability of memory locations within the executable operating system kernel is performed using the binary instructions of the executable operating system kernel, it may be inferred that a memory location constitutes a pointer because, for example, the memory location contains a value that may be reasonably expected to be a memory location or because, for example, the structure of the memory corresponds to a recognizable pointer-based data structure such as a linked list or for some other such indicative reason. Such heuristics may be used in an embodiment where the static analysis of the executable operating system kernel to determine the reachability of memory locations within the executable operating system kernel is performed using the source code as well, to, for example, improve the fidelity of the determination.

As edges in the reachability graph are added to represent a target pointer which may be derived from either the address of the source pointer or the data pointed to by a source pointer, the target pointer may be selected as a new source pointer to determine any further target pointers which may be derived from either the address of the new source pointer or the data pointed to by the new source pointer. In this manner, the graph may be built up from one or more starting source pointers to determine all memory locations which may potentially be reachable from those starting source pointers. For example, a source pointer may be selected and there may be two target pointers which may be derived from either the address of that source pointer or from the data pointed to by that source pointer. The first of those two target pointers may have three additional target pointers which may be derived from either the address of that first target pointer or from the data pointed to by that first target pointer. In such an example, the reachability graph may contain a first vertex representing the source pointer, two edges connecting from the first vertex to vertices representing the two target pointers and three additional edges connecting from the vertex representing the first target pointer to vertices representing the three additional target vertices.

Edges in the reachability graph may be tagged with type information describing the layout of the data structure that enabled the target pointer associated with that edge to be derived from the address of the source pointer associated with that edge or the data pointed to by the source pointer associated with that edge. For example, if a source pointer points to a data structure with an integer, a string, a counter, the target pointer and an array of other values, the edge of the reachability graph may be tagged with type information indicating this data structure. The type information may also include offset information describing one or more relative offsets for the source pointer, the target pointer, or both associated with the edge. In the above example, the target pointer may be sixteen bytes from the beginning of the data structure pointed to by the source pointer, and the edge of the reachability graph may also be tagged with that offset information. The type information may also include other information relating to how the target pointer may be derived from the source pointer including, but not limited to, memory alignment information, number of other pointers associated with the source pointer, source code information and/or other such information.

As was mentioned herein above, static analysis may typically be performed, and a reachability graph constructed, by starting with one or more starting locations and then examining any reachable locations which may be accessible from those starting locations followed by examining any reachable locations which may be accessible from those reachable locations and so on. A memory location which does not have any memory locations which may be reached from that memory location (e.g., has no "child" memory locations) may be referred to herein as a terminal memory location. The presence of a terminal memory location may be used to terminate static analysis of a reachability graph. A terminal memory location may have one or more properties associated with the traversal including, but not limited to, information about one or more pointer transformations which may be used to access the terminal memory location in a traversal. When multiple reachable locations may be accessible from a location, those multiple locations may be examined using typical recursive traversal techniques such as breadth-first traversal, depth-first traversal and/or other such techniques. The reachability graph may be constructed using a "forward" traversal (a traversal from one or more starting locations to one or more accessible target locations). The reachability graph may be constructed using a "backward" traversal (a traversal that determines starting locations that access one or more interesting target locations). The reachability graph may be constructed using a combination of forward and backward traversals. For example, in an embodiment where the static analysis is unable to link together different subsections of a reachability graph using a forward traversal, the static analysis may attempt one or more backward traversals to complete the linkage.

Other enhancements to the static analysis to determine the reachability graph may be performed. For example, the static reachability analysis may be enhanced by performing the analysis in a context-sensitive fashion such as, for example, by examining the VM image in combination with a running instance of the VM image, thereby providing additional context for the analysis. Examining a running instance of a VM image may be performed using a dynamic analysis of the running VM image (e.g., by instrumenting the running VM image using one or more dynamic analysis tools), by taking a snapshot of the running VM image or by a combination of these and/or other such analysis techniques. Similarly, the static reachability analysis may be enhanced by inlining shared data structure accessor methods in the operating system kernel into the examined data structures. Wining shared data structures (which is not the same as inlining operating system code as described herein below) is the practice of, upon locating a reference to a shared data structure within a data structure, making a copy of that shared data structure and inserting it in place of the reference. Inlining of shared data structures may provide additional context to the analysis because the copy of the shared data structure contains the data state of the shared data structure at the time that it is accessed. This additional context may enhance the static analysis because of that additional context. As may be contemplated, the methods of enhancing the static analysis to produce the reachability graph described herein are merely illustrative examples, and other such methods of enhancing the static analysis to produce the reachability graph may be considered as within the scope of the present disclosure.

Figure 3:
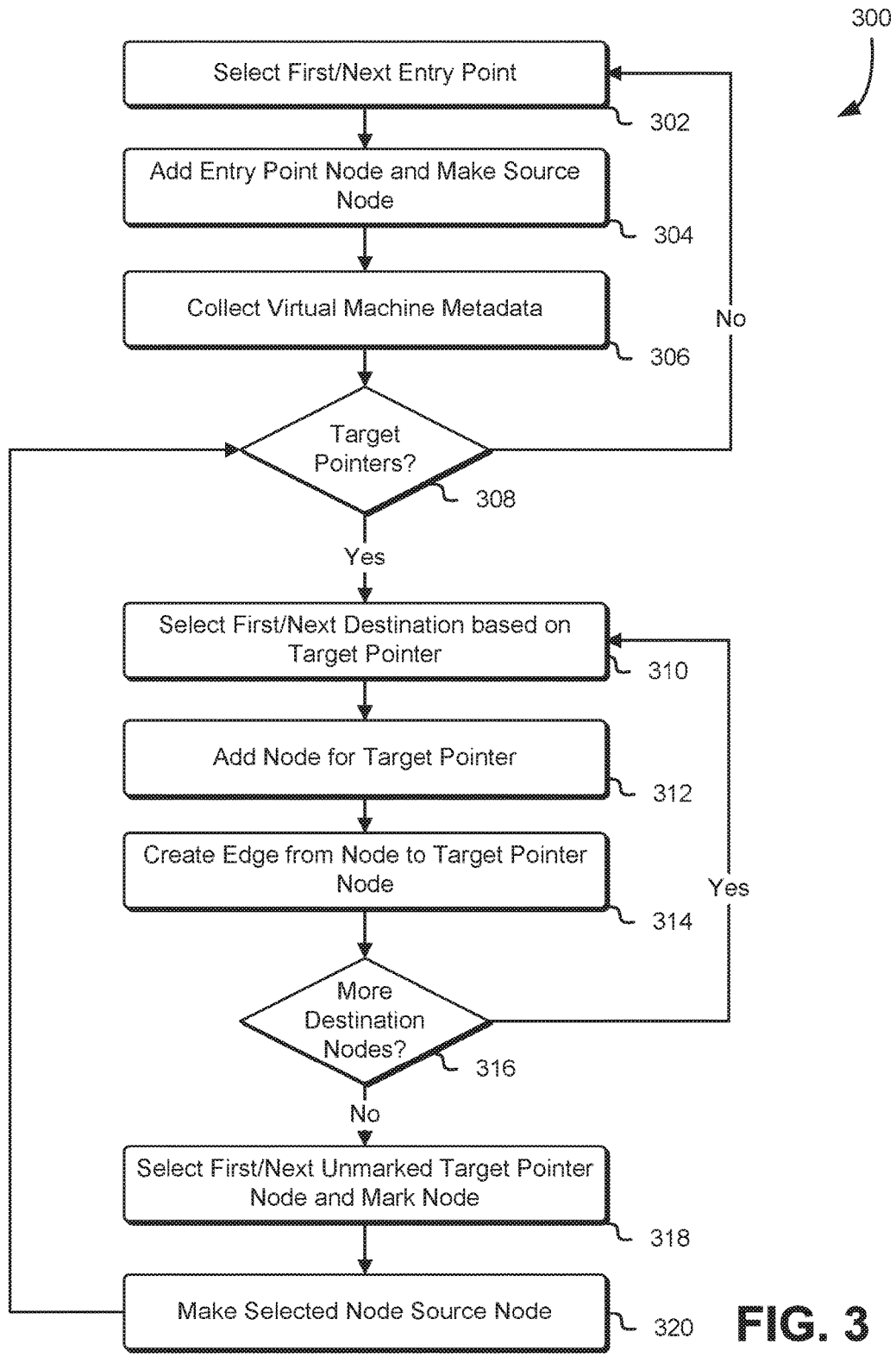
FIG. 3 illustrates an example process for constructing an initial pointer reachability graph associated with a virtual machine image in accordance with an embodiment.

FIG. 3 illustrates an example process 300 for constructing an initial pointer reachability graph associated with a virtual machine image as described in connection with FIG. 2 and in accordance with at least one embodiment. A hypervisor such as the hypervisor 212 described in connection with FIG. 2 and in accordance with at least one embodiment may perform the process illustrated in FIG. 3. The hypervisor, provided with a virtual machine image, may select an entry point 302 within the virtual machine image as described herein. The hypervisor may then add the selected entry point node to the graph and make that selected entry point node the source node 304. The hypervisor may then collect virtual machine metadata 306 associated with the virtual machine image (e.g., a kernel identifier) and may associate it with the graph, and then may begin static analysis of the virtual machine image.

First, the hypervisor may determine whether there are any target pointers 308 that are reachable from the source location. As described herein, the determination of whether there may be any target pointers 308 from the source may be complicated by the fact that a number of techniques may be used to optimize memory usage and manipulation within an operating system. For example, as mentioned herein, memory locations may be stored in a byte array and may not be explicitly designated as pointers. An initial static analysis may not determine that such a byte array contains one or more pointers. Later analysis (e.g., seeing how that byte array is used, or perhaps related to source code for the operating system) may determine that at least a portion of the byte array does contain a pointer. One or more heuristics may be applied to the analysis of a byte array to determine whether or not such a byte array may possibly contain one or more pointers such as, for example, based on the location of the byte array, based on interpreting the contents of the byte array as multi-byte values and/or some other such technique. In such examples, data structures which may possibly contain one or more pointers may be marked for further analysis using one or more additional analysis techniques.

For each of the target pointers and/or each of the potential target pointers, the hypervisor may select each of the destinations 310, may create a target node based at least in part on the target pointer 312 and connect the target node to the source node by creating an edge 314 between the source node and the target node. In an embodiment, the created edge includes information associated with the relationship between the source node and the target node. For example, when the target node is an eight-byte pointer created from the fifth through the twelfth bytes of a sixteen-byte array, the created edge may be annotated with information indicating the source data structure, the relative offset, the data length, any pointer transformations, memory alignment (e.g., four-byte, eight-byte, etc.) and so on. In another example, when the target node is known to be a pointer within a known data structure, a description of the data structure may be included in the information associated with the edge. In some embodiments, an initial confidence score may be determined and included in the information associated with the edge. For example, the hypervisor may be configured to determine that a particular data structure definitely contains a pointer and thus may assign a high level of confidence to that relationship.

A pointer transformation may be a mapping from one memory address location to another memory address location. For example, an application may be typically loaded into a starting memory address location as specified in the virtual machine image. This starting memory address location may be specified by the application, may be specified by the kernel or may be specified in some other manner. Similarly, a pointer reference within that application (e.g., one that may be used to build the pointer reachability graph) may be located at a defined offset from that starting memory address location when the code for that application is loaded contiguously in memory. When the virtual machine is instantiated from the virtual machine image, the starting address location for the application may instead by moved to a different location within the computer memory, introducing a first pointer transformation (from the specified starting memory address location to the different location). Similarly, when the application begins execution, the operating system may move pages of memory around within the system, possibly altering the pointer reference within the application and introducing a second pointer transformation. Different execution parameters for a virtual machine and/or for pointer references within that virtual machine may vary between different instantiation and/or between different snapshots, thus introducing possibly different pointer transformations for each snapshot. In some embodiments, where the hypervisor may have access to some or all of the source code associated with an application and/or with an operating system kernel, the hypervisor may use this source code information to produce higher fidelity pointer transformations and/or to produce pointer reachability graphs with higher confidence scores.

When analyzing the source and destination nodes, the hypervisor may use one or more correlations between the snapshot and the pointer reachability graph to determine the pointer transformations and may use these correlations to traverse the graph. As mentioned herein, the traversal may typically continue until either a data structure that may be a kernel data structure is reached or until a data structure that is not a kernel data structure is reached, but there are no further pointers that may be traversed. A data structure that may be a candidate to be a kernel data structure may be evaluated to determine whether, based on the virtual machine, it may be likely that the data structure is a kernel data structure. For example, memory that is in kernel memory may be a kernel data structure while memory that is not in kernel memory may not be a kernel data structure. Similarly, memory that conforms to memory alignment requirements for the kernel may include a kernel data structure while memory that does not may not contain a kernel data structure. The memory alignment requirement may be based on a requirement that kernel memory structures strictly conform to memory alignment requirements (for example, because certain CPUs will not execute kernel code that does not conform). So, if the specification of a kernel requires memory pages be aligned on eight byte boundaries (a requirement that may be less strictly enforced for user space code) then memory pages that are not so aligned may not contain kernel data structures.

The hypervisor may then continue analyzing source and destination nodes 316, selecting each for analysis, analyzing those destination nodes 318, and then selecting and analyzing any child nodes 320. The example process illustrated in FIG. 3 illustrates a breadth first approach (analyzing each child node in order before analyzing the child nodes of those child nodes). However, an exhaustive analysis of the memory structure may also proceed in a depth-first (analyzing each path down to terminal locations, also referred to herein as "terminal nodes") or some other such analysis methodology.

Figure 4:
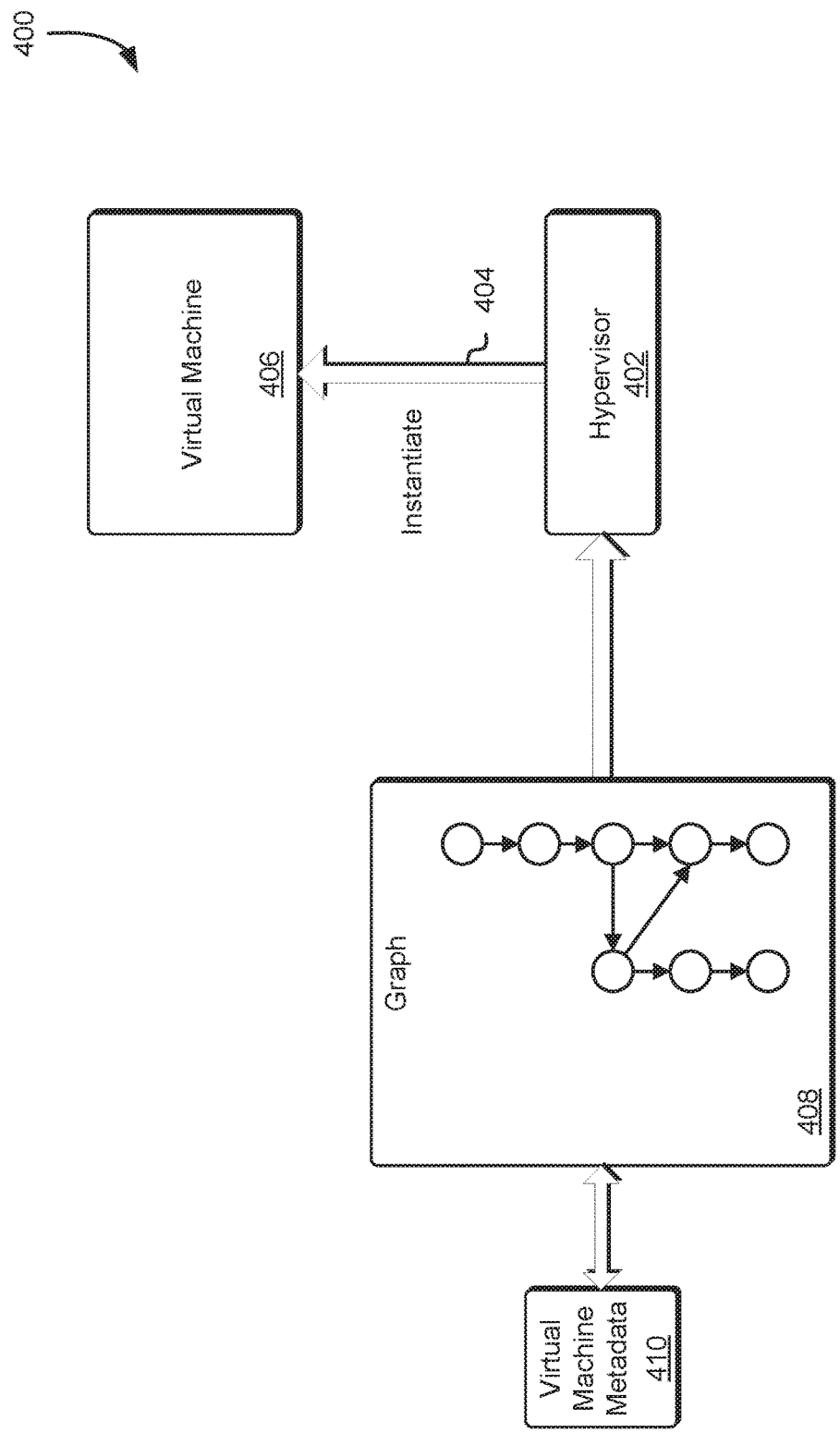
FIG. 4 illustrates an example environment where a virtual machine image associated with a pointer reachability graph may be instantiated in accordance with an embodiment.

FIG. 4 illustrates an example environment 400 where a virtual machine image associated with a pointer reachability graph may be instantiated as described in connection with FIG. 1 and in accordance with at least one embodiment. A hypervisor 402 may instantiate 404 a virtual machine 406. The virtual machine 406 may be based in part on a pointer reachability graph 408 such as the reachability graph 202 or the reachability graph 208 as described herein in connection with FIG. 2. In the example illustrated in FIG. 4, the pointer reachability graph corresponds to the reachability graph 208. The virtual machine 406 may also be based at least in part on data contained in the virtual machine metadata 410 which may include information about the operating system version for the virtual machine, may include information about the virtual machine image that was statically analyzed to produce the pointer reachability graph 408, may contain information about the kernel version, may contain information about patches applied to the virtual machine or may contain other such metadata.

The hypervisor 402 may instantiate a plurality of instances of a virtual machine 406. For example, a plurality of instances of a virtual machine 406 may be instantiated by the hypervisor 402 based on a kernel identifier specified in the virtual machine metadata 410. Each instance of the plurality of instances may be configured to perform one or more operations that may be associated with the pointer reachability graph 408. For example, if the pointer reachability graph was created based on an entry point within a user-space application as described herein, instances of the plurality of instances may be configured with that user-space application running in one or more states. Similarly, some instances of the plurality of virtual machine instances may be based on compatible, related and/or similar operating system versions, compatible, related and/or similar applications and other compatible, related and/or similar configurations.

Figure 5:
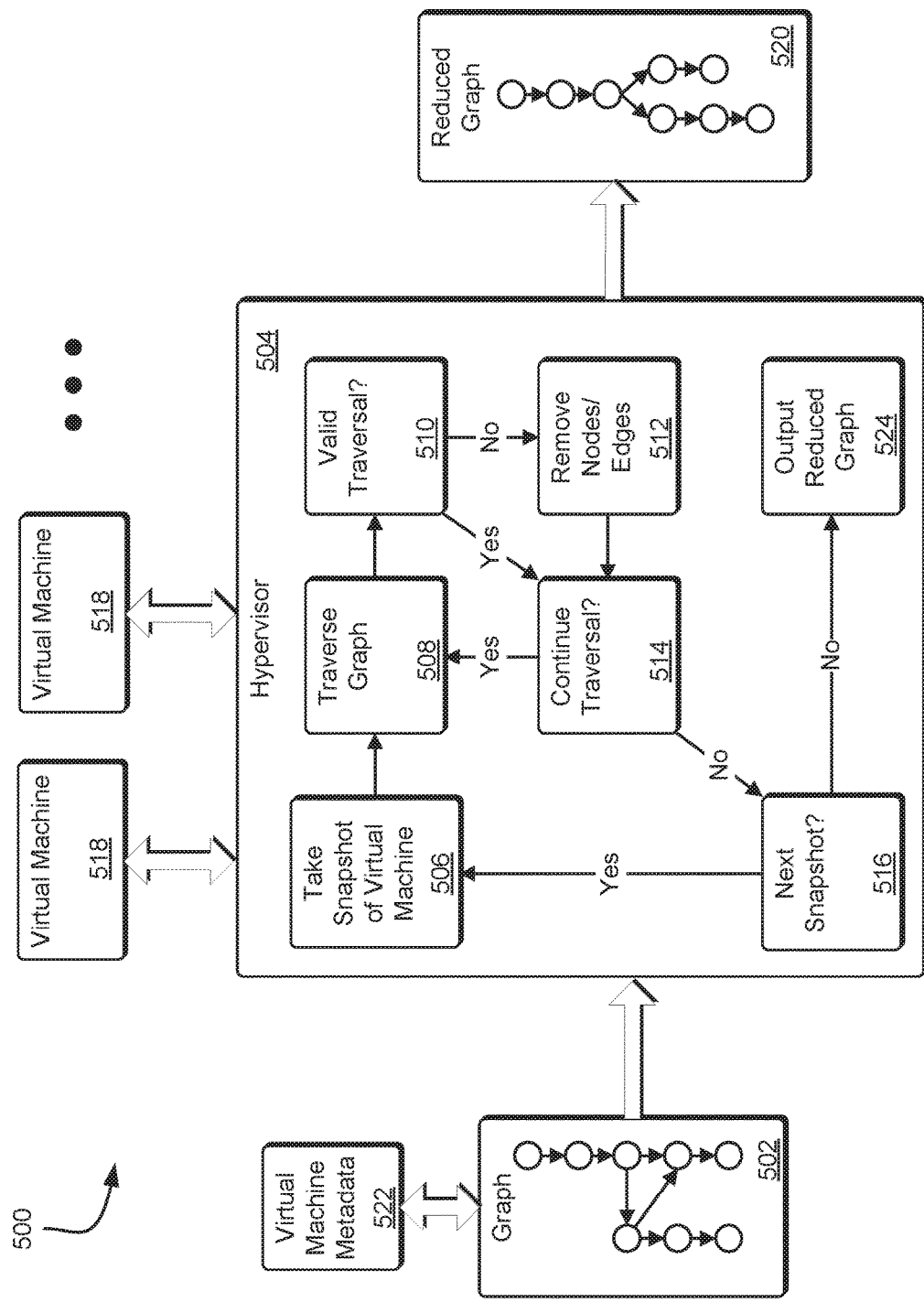
FIG. 5 illustrates an example environment where an initial pointer reachability graph may be validated and reduced in accordance with an embodiment.

FIG. 5 illustrates an example environment 500 where an initial pointer reachability graph may be validated and reduced based at least in part on a virtual machine instantiation as described herein in connection with FIG. 1 and in accordance with at least one embodiment. A hypervisor 504 may first instantiate a representative virtual machine 518 based at least in part on a pointer reachability graph 502 and based at least in part on virtual machine metadata 522 associated with the pointer reachability graph 502 as described in connection with FIG. 4 and in accordance with at least one embodiment. Next, the hypervisor may begin taking memory snapshots 506 of the representative virtual machine. The hypervisor may take multiple snapshots of the representative virtual machine. For example, the hypervisor may take a first snapshot upon starting the VM and take subsequent snapshots periodically while the VM is running. Snapshots may be taken in different states of execution of the representative VM such as, for example, before and after starting one or more applications within the VM, before and after starting one or more services within the VM and so on. The hypervisor may take a snapshot after a time delay in order that it may be ensured, for example, that the system reaches some pre-determined state and/or configuration before the snapshot is taken. The hypervisor may examine one or more states of the virtual machine before taking a snapshot. The hypervisor may instantiate an application and/or a monitor on the virtual machine that may be configured to produce one or more event notifications related to virtual machine states and/or snapshot states.

The hypervisor may then begin analyzing the validity of the pointer reachability graph by first selecting an entry point in the pointer reachability graph and then by traversing the graph 508 starting from that entry point. In order to validate the traversal, the hypervisor may first associate the selected entry points with corresponding memory locations in the memory snapshot. The selected entry points may not precisely correspond with memory locations in the memory snapshot because application code may be loaded into the virtual machine at different memory offsets. For example a virtual machine may use techniques such as address layout randomization techniques that may load application code into different sections of memory each time the application is executed. In such an example, selected entry points may correspond with memory location that may be offset from the original entry point memory location. This offset may be included in metadata associated with the selected entry point in the virtual machine metadata 522. This offset may also be calculated by performing operations related to the one or more pointer transformations described herein such as, for example, reversing the transformations in order to calculate the offset. This offset may be determined by using one or more heuristics associated with one or more previous snapshots and/or traversals. In such examples, the hypervisor may use initial snapshots to search for correspondences between entry points in the pointer reachability graph 502 and thus to determine the offset.

Using the correspondence between the entry point and the memory snapshot, the hypervisor may then attempt to validate a traversal 510 of the pointer reachability graph by tracing through the memory snapshot from the selected entry points to reachable kernel structures based at least in part on the pointer reachability graph. The hypervisor may attempt to validate the traversal 510 of the pointer reachability graph by first mapping a source pointer in the pointer reachability graph to a memory location in the memory snapshot. The hypervisor may next retrieve a pointer address from the memory location. The hypervisor may next select an edge of the pointer reachability graph that originates from the source pointer and terminates at a target pointer and based on this selected edge, the hypervisor may calculate a pointer transformation from the source pointer to a target pointer associated with the edge. The hypervisor may then transform the pointer address using the pointer transformation and may retrieve a portion of the memory snapshot based at least in part on the transformed pointer address and the type information (e.g., byte size and/or memory alignment) from the metadata which may be associated with the edge. Based on this, the hypervisor may finally complete the validation of the traversal by, for example, validating that the pointer address and transformed pointer address are legal memory addresses, validating that the portion of the memory snapshot contains data laid out in accordance with the type information, by validating that data fields included in the portion of the memory snapshot are appropriately memory-aligned or by a combination of these and/or other such validation operations and/or validation criteria.

In the event that the hypervisor is unable to validate a traversal 510, the hypervisor may remove one or more nodes and/or edges 512 corresponding to the invalid traversal. For example, if the hypervisor finds illegal memory addresses in the traversal, the hypervisor may remove edges in the pointer reachability graph that reference those illegal memory addresses and may also remove any nodes which have those illegal memory addresses as their target nodes. The hypervisor may delay removing the one or more nodes and/or edges that are not valid and may instead mark those nodes and/or edges for later removal. The hypervisor may adjust a confidence score associated with the nodes and/or edges based on the validation results. The hypervisor may lower confidence scores for nodes and edges associated with traversals that do not reach kernel data structures and may increase confidence scores for nodes and edges associated with traversals that do reach kernel data structures.

The hypervisor may next determine whether to continue the traversal 514 based on the current memory snapshot and, if so, may attempt additional traversals based, for example, on additional entry points. The hypervisor may also determine whether to continue analysis by taking additional snapshots 516 and by analyzing those additional snapshots. The hypervisor may perform multiple traversals based on multiple entry points and/or multiple snapshots in order to more confidently identify traversals which may lead to kernel data structures. The hypervisor may perform multiple analyses to reduce the effect of, during a particular traversal, using a snapshot that was not in a state that was accessing a kernel data structure at the time of the snapshot, or using a snapshot that was in a state where it was copying data between locations (a common system operations), thus rendering the traversal fully or partially invalid. The aggregation of the traversals may increase the confidence that a kernel data structure has been found and/or increase the confidence that a kernel data structure has not been found. For example, if more than a first threshold number of the traversals that are based on multiple snapshots do not reach a kernel data structure from a subgraph of the pointer reachability graph, it may be an indication that that subgraph (and thus the associated memory locations) should be removed from the pointer reachability graph. Conversely, if more than a second threshold value of traversals based on multiple snapshots do reach a kernel data structure from a subgraph of the pointer reachability graph, it may be an indication that that subgraph (and thus the associated memory locations) should be retained in the pointer reachability graph. As a final step, the hypervisor may output the reduced pointer reachability graph 524 that may contain nodes and edges that meet the threshold criteria. The reduced graph 520 may also include the virtual machine metadata and may also contain information related to the one or more traversals that may have been used to produce the reduced graph 520.

Figure 6:
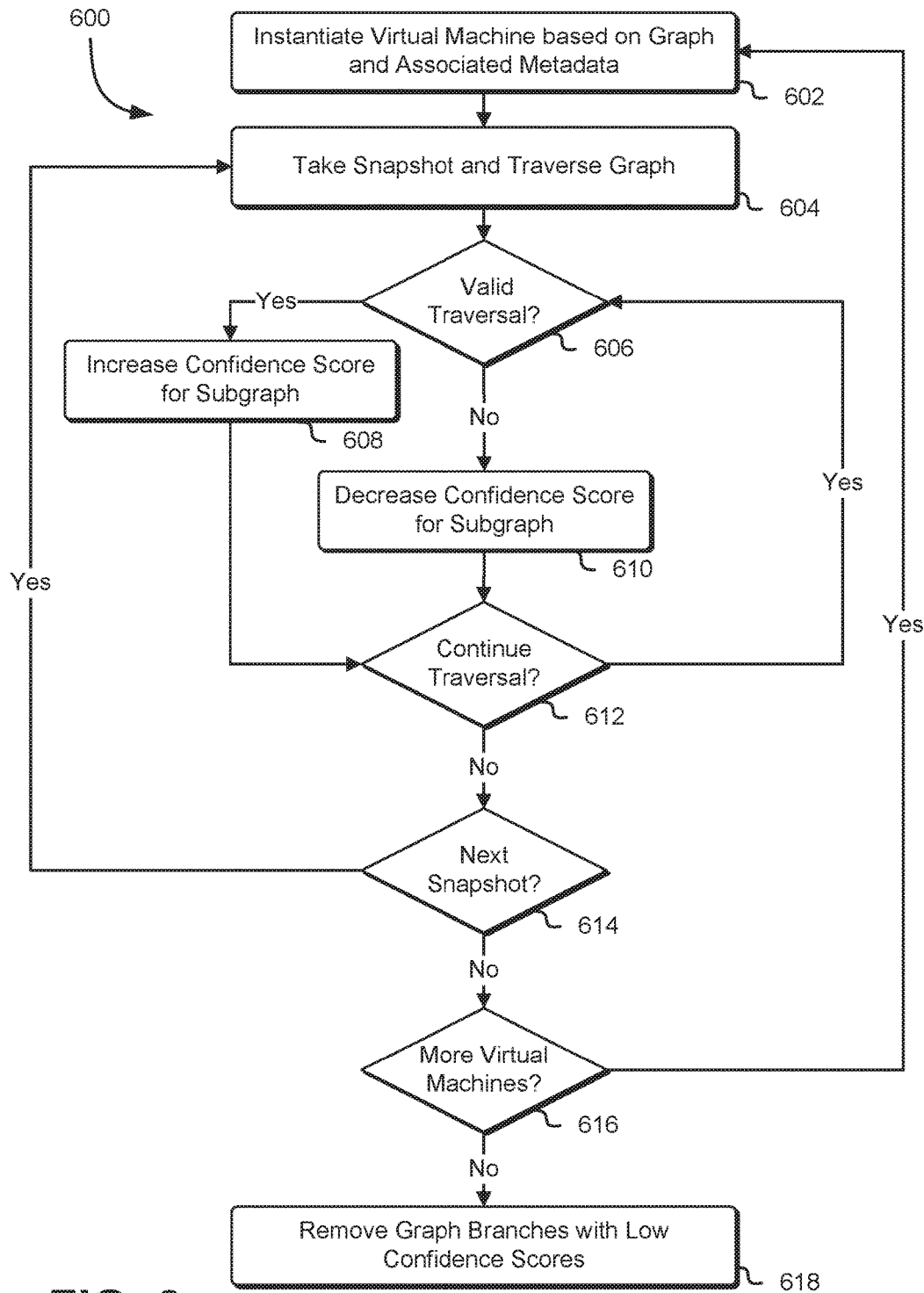
FIG. 6 illustrates an example process for reducing an initial pointer reachability graph in accordance with an embodiment.

FIG. 6 illustrates an example process 600 for reducing an initial pointer reachability graph 502 as described in connection with FIG. 5 and in accordance with at least one embodiment. A hypervisor such as the hypervisor 212 described in connection with FIG. 2 and in accordance with at least one embodiment may perform the process illustrated in FIG. 6. The hypervisor may first instantiate a virtual machine based on the pointer reachability graph and the associated metadata 522 as described in association with FIG. 5 and in accordance with at least one embodiment. The hypervisor may then take a snapshot of the virtual machine and may traverse the graph 604 from the one or more entry points 602 also as described in association with FIG. 5 and in accordance with at least one embodiment.

If, during the traversal, the hypervisor does complete a valid traversal 606 such as, for example, by reaching a kernel data structure, the hypervisor may increase a confidence score for the subgraph 608 associated with the traversal that reaches the kernel data structure. Conversely, if during the traversal, the hypervisor does not complete a valid traversal 606 such as, for example, by reaching an illegal memory location or by terminating in a memory location that does not reach a kernel data structure, the hypervisor may decrease a confidence score for the subgraph 610 for that portion of the traversal that is invalid. A valid or an invalid traversal may only be valid or invalid for a portion of the pointer reachability graph and, in such embodiments, only that portion may have the associated confidence scores increased or reduced.

After adjusting the confidence scores, the hypervisor may determine whether the current traversal, based on the current snapshot, should be continued 612 and, if not, whether a next snapshot 614 should be taken and the process repeated, based on that next snapshot. The hypervisor may also determine whether any additional virtual machines 616 should be instantiated and, if so, may instantiate the next virtual machine. When the hypervisor completes the one or more traversals of the one or more snapshots of the one or more virtual machines, the hypervisor may remove any subgraph sections 618 with confidence scores below a determined threshold value to produce a pointer reachability graph with branches with high confidence scores only. The traversal may include a single virtual machine instantiation or may include a plurality of virtual machine instantiations. The traversal may also include a single snapshot of each virtual machine instantiation or may include a plurality of snapshots of each virtual machine instantiation.

Figure 7:
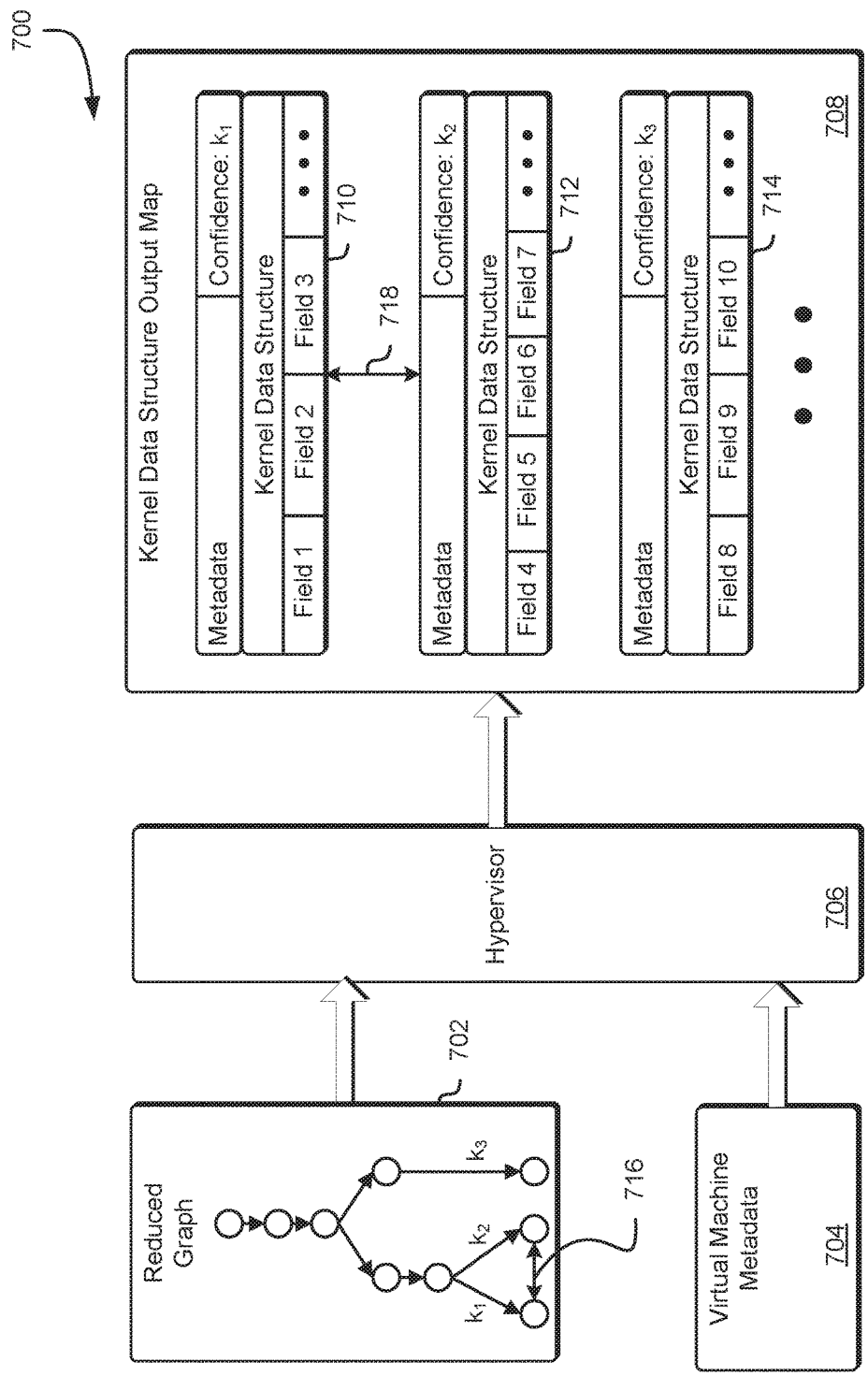
FIG. 7 illustrates an example environment where a kernel data structure output map may be generated in accordance with an embodiment.

FIG. 7 illustrates an example environment 700 where a kernel data structure output map may be generated based on a reduced pointer reachability graph such as the reduced pointer reachability graph described herein at least in connection with FIG. 6 and in accordance with at least one embodiment. The reduced pointer reachability graph 702 and the virtual machine metadata 704 may be analyzed by the hypervisor 706 to produce the kernel data structure output map 708. As mentioned herein, the reduced pointer reachability graph 702 may include data and/or metadata associated with the traversal, with the confidence score, with the data structures, with the pointer offsets or other data and/or metadata. This, in addition to the virtual machine metadata, may be used to create the kernel data structure output map 708. Each kernel data structure in the kernel data structure output map 708 may include one or more fields and identification information associated with those fields including, but not limited to, a data type of the field, a data size of the field or an identifier of the field. Each kernel data structure in the kernel data structure output map 708 may also include other metadata associated with the kernel data structure including, but not limited to, metadata derived from the data and/or metadata associated with the reduced pointer reachability graph 702, metadata derived from the data and/or metadata associated with the virtual machine metadata 704 or metadata derived from other associated data and/or metadata.

In the example illustrated in FIG. 7, the metadata associated with each of the kernel data structures in the kernel data structure output map 708 includes a confidence score. The confidence scores may be based at least in part on the traversal of the pointer reachability graph and/or may be based at least in part on the traversal of the reduced graph and may indicate the confidence that the graph may lead to the kernel data structure in question, from the associated entry point. In the example illustrated in FIG. 7, the reduced pointer reachability graph 702 includes two kernel data structure nodes 716 with confidence scores of $k_1$ and $k_2$. The first of the two kernel data structure nodes 716, with a confidence score of $k_1$, is represented by kernel data structure 710. The second of the two kernel data structure nodes 716, with a confidence score of $k_2$, is represented by kernel data structure 712. The relationship between the two kernel data structure nodes 716 (i.e., that either may be a candidate kernel data structure associated with the entry point) may be illustrated in the kernel data structure output may with the relationship 718. The third kernel data structure 714 in kernel data structure output map 708 may represent the other terminal node in the reduced pointer reachability graph 702 and may include a confidence score $k_1$, but may not have an alternative kernel data structure relationship such as the relationship between the two kernel data structure nodes 716.

Figure 8:
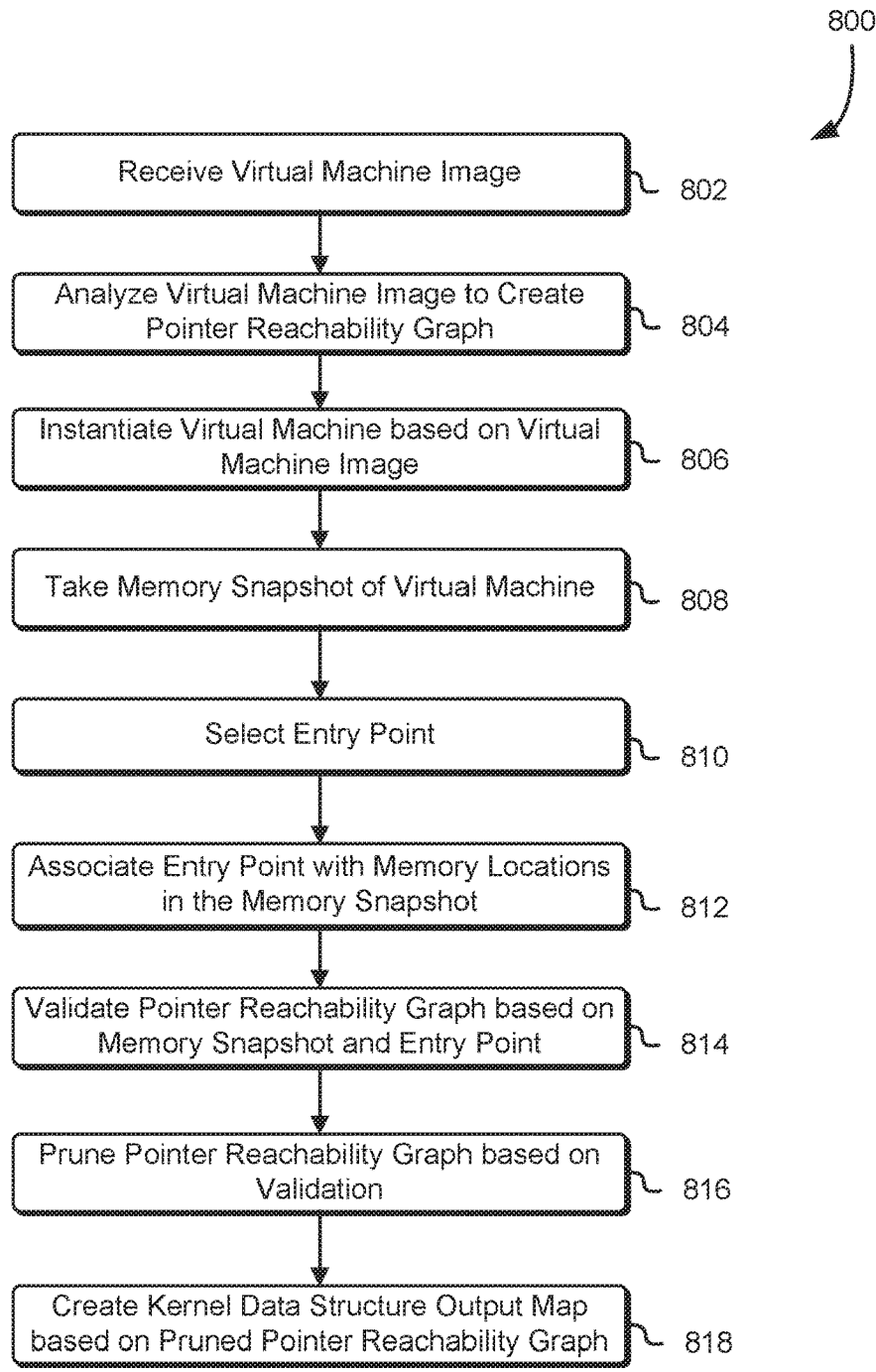
FIG. 8 illustrates an example process for identifying kernel data structures in accordance with an embodiment.

FIG. 8 illustrates an example process 800 for identifying kernel data structures as described herein in connection with FIG. 1 and in accordance with at least one embodiment. First, a hypervisor may receive a virtual machine image 802. Next, the hypervisor may analyze the virtual machine image to produce a pointer reachability graph 804. Next, the hypervisor may instantiate one or more representative virtual machines 806 for analysis, the one or more representative virtual machines based at least in part on the virtual machine and also based at least in part on the pointer reachability graph. Next, the hypervisor may take one or more memory snapshots of the representative virtual machine. For example, as mentioned herein, the hypervisor may take a first snapshot upon starting the virtual machine and take subsequent snapshots periodically while the virtual machine is running. Next, the hypervisor may select one or more user process entry points 810 of the representative virtual machine and may associate the selected entry points with corresponding memory locations in the memory snapshot 812. Next, the hypervisor may validate the pointer reachability graph 814 by, for example, tracing through the memory snapshot from the selected entry points to reachable kernel structures based at least in part on the pointer reachability graph. Finally, the hypervisor may update the pointer reachability graph by removing pointers or edges that were not validated 816 and may create a kernel data structure layout map based at least in part on the updated pointer reachability graph 818.

Figure 9:
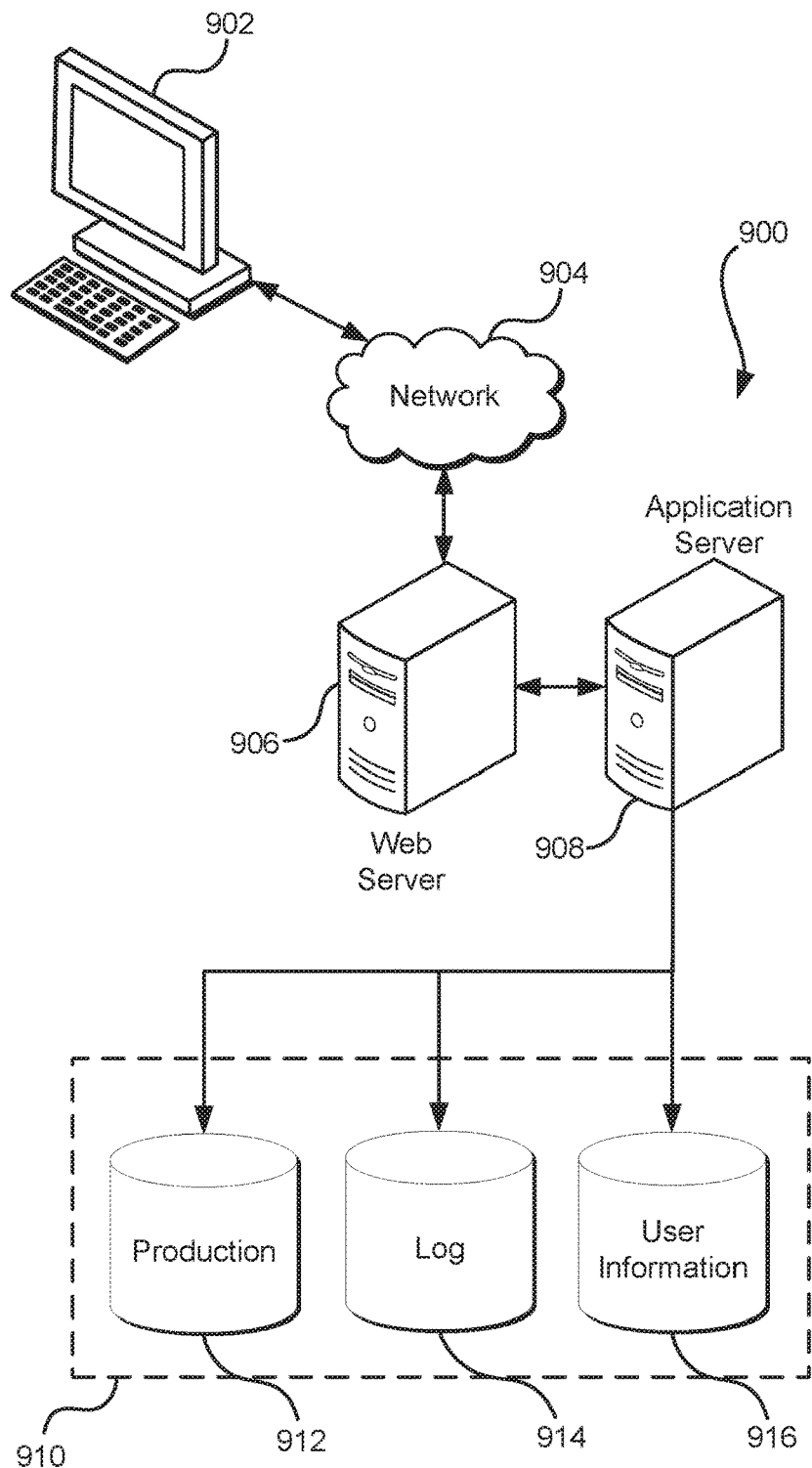
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail.

Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the electronic client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NES"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   retrieving execution state information corresponding to a first virtual machine; and
   computing, based at least in part on the execution state information, a score indicative of a degree of confidence that a target kernel memory location is able to be determined based at least in part on a source memory location, wherein the score is computed based at least in part on traversal of a representation of memory location relationships within the first virtual machine, and wherein a second virtual machine is configured, based at least in part on the score and the target memory location, to protect a data structure of the second virtual machine.

2. The computer-implemented method of claim 1, wherein the score is computed further based at least in part on whether the target memory location satisfies validation criteria.

3. The computer-implemented method of claim 1, wherein the second virtual machine is:
   instantiated based at least in part on a virtual machine image; and
   configured based at least in part on the representation of memory location relationships within the virtual machine image, the representation based at least in part on the score and the target memory location.

4. The computer-implemented method of claim 3, further comprising generating the representation based at least in part on metadata of the virtual machine image, the metadata specifying one or more of:
   a kernel version,
   an application, or
   an operating system type.

5. The computer-implemented method of claim 3, wherein computing the score includes:
   performing, starting from the source memory location, an attempted traversal of memory location relationships of the representation to the target memory location;
   producing an updated representation based at least in part on the attempted traversal; and
   computing the score based at least in part on the updated representation.

6. The computer-implemented method of claim 5, wherein computing the score includes:
   on a condition that the attempted traversal fails, updating the score to indicate a decreased likelihood that the target memory location is determinable based at least in part on a source memory location; and
   on a condition that the attempted traversal succeeds, updating the score to indicate an increased likelihood that the target memory location is determinable based at least in part on a source memory location.

7. The computer-implemented method of claim 1, further comprising:
   determining, by examining a virtual machine image from which the virtual machine is instantiated, a graph of memory locations within the virtual machine; and
   determining the source memory location and the target memory location based at least in part on the graph.

8. The computer-implemented method of claim 7, further comprising removing, based at least in part on the score being a value relative to a threshold, a node from the graph.

9. A system, comprising:
   one or more processors; and memory to store computer-executable instructions which, in response to execution by the one or more processors, cause the system to at least:
  instantiate a first virtual machine;
  retrieve execution state information corresponding to the virtual machine; and
  compute, based at least in part on the execution state information, a score indicative of reachability of a target memory location from a source memory location, wherein a second virtual machine is configured to protect a vulnerable data structure, based at least in part on the score and the target memory location.

10. The system of claim 9, wherein the computer-executable instructions that cause the system to compute the score further include instructions that cause the system to compute the score based at least in part on results of an attempt to traverse, from the source memory location to the target memory location, a representation of relationships between memory locations.

11. The system of claim 9, wherein the target memory location is associated with a kernel data structure.

12. The system of claim 9, wherein the computer-executable instructions that indicate the target memory location include instructions that cause the system to provide, based at least in part on the score reaching a value relative to a threshold, a set of associations that concludes at the target memory location.

13. The system of claim 9, wherein the computer-executable instructions that cause the system to instantiate the virtual machine include instructions that cause the system to instantiate the virtual machine based at least in part on a representation of relationships between memory locations.

14. The system of claim 13, wherein the representation includes:
  a first node corresponding to a first data structure within the execution state information;
  a second node corresponding to a second data structure within the execution state information; and
  an edge that indicates a pointer from the first data structure to a memory location of the second data structure.

15. A non-transitory computer-readable storage medium that stores computer-executable instructions which, if executed by one or more processors of a computer system, cause the computer system to at least:
  retrieve execution state information corresponding to an instantiated virtual machine, the execution state information based at least in part on analysis of a virtual machine image; and
  compute, based at least in part on the execution state information, a score indicative of a confidence that a target memory location is able to be determined based at least in part on a source memory location, wherein the instantiated virtual machine is configured to protect a kernel memory location, based at least in part on the score and the target memory location.

16. The non-transitory computer-readable storage medium of claim 15, wherein the score further indicates a likelihood of whether the target memory location is associated with a kernel data structure.

17. The non-transitory computer-readable storage medium of claim 15, wherein the computer-executable instructions further include instructions that cause the computer system to:
  retrieve second execution state information corresponding to the instantiated virtual machine; and
  update the score based at least in part on the second execution state information.

18. The non-transitory computer-readable storage medium of claim 15, wherein the computer-executable instructions further include instructions that cause the computer system to:
  instantiate the instantiated virtual machine based at least in part on a virtual machine image;
  generate a representation of memory location relationships within the virtual machine image; and
  configure the instantiated virtual machine based at least in part on the representation.

19. The non-transitory computer-readable storage medium of claim 18, wherein:
  the representation is a graph comprising pointers to memory locations in the virtual machine image; and
  the computer-executable instructions include computer-executable instructions that cause the computer system to instantiate, in accordance with the graph, the instantiated virtual machine based at least in part on the virtual machine image.

20. The non-transitory computer-readable storage medium of claim 19, wherein:
  the graph includes the source memory location and the target memory location; and
  the computer-executable instructions that cause the computer system to compute the score include instructions that cause the computer system to compute the score based at least in part on results of attempts to traverse the graph from:
    the source memory location to the target memory location; and
    the target memory location to the source memory location.

* * * * *